United States Patent [19]

Rogers

[11] Patent Number: 4,974,361

[45] Date of Patent: Dec. 4, 1990

[54] MEANS AND A METHOD OF INCREASING PRODUCTION OF TREES FOR HARVESTING

[76] Inventor: Charles A. Rogers, 1205 S. Hockaday Rd., Gladwin, Mich. 48624

[21] Appl. No.: 473,403

[22] Filed: Feb. 1, 1990

[51] Int. Cl.$^5$ ............................................ A01G 17/10
[52] U.S. Cl. .......................................... 47/43; 47/1.01
[58] Field of Search ............... 47/1.01, 4, 6, 8, 42, 47/43, DIG. 3, 5.5

[56] References Cited

U.S. PATENT DOCUMENTS 2,048,056  7/1936  Boehm ..................................... 47/6

FOREIGN PATENT DOCUMENTS 355672  6/1922  Fed. Rep. of Germany .......... 47/42
1376983  2/1988  U.S.S.R. ................................... 47/42

Primary Examiner—David A. Scherbel
Assistant Examiner—Jerrold D. Johnson
Attorney, Agent, or Firm—Terry M Gernstein

[57] ABSTRACT

Yield of harvested trees is increased by cutting the harvested trees superadjacent to a lowermost whorl of tree limbs and supporting such tree limbs in a manner and until such supported tree limbs generate sprouts that are mature enough to be either re-planted or harvested themselves. The sprouts can also be harvested in the same manner to generate further sprouts.

8 Claims, 3 Drawing Sheets

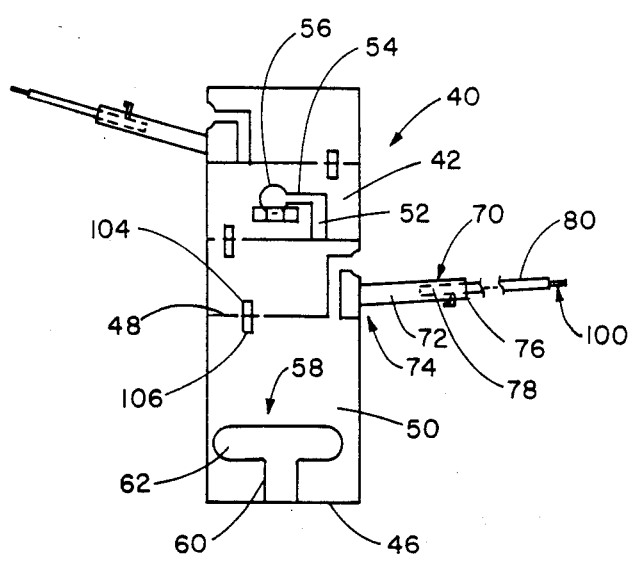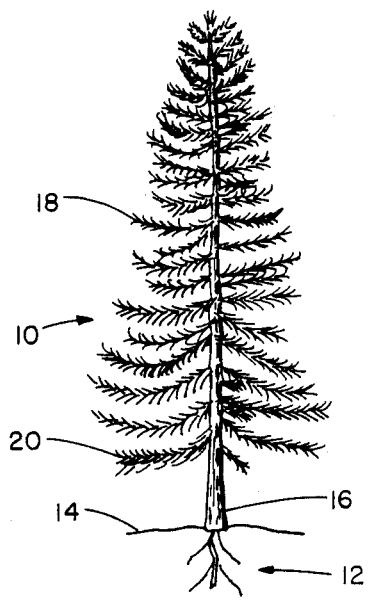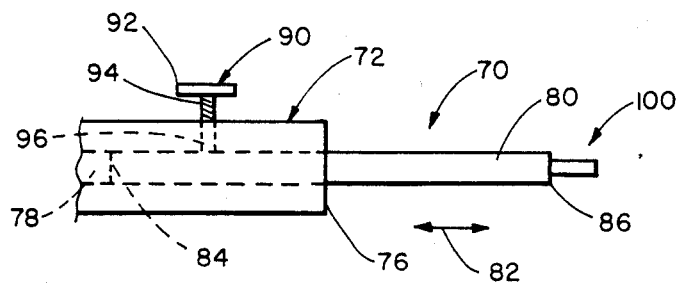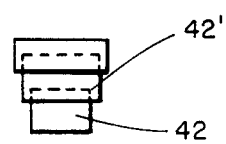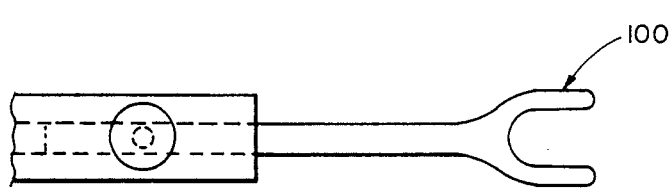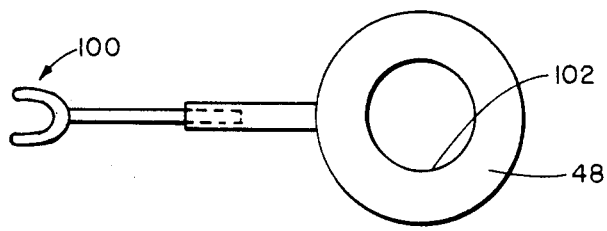

MEANS AND A METHOD OF INCREASING PRODUCTION OF TREES FOR HARVESTING

TECHNICAL FIELD OF THE INVENTION

The present invention relates to the general art of forestry, and to the particular field of increasing the yield of harvested trees.

BACKGROUND OF THE INVENTION

A tree is a plant, and like most plants, it has roots, a stem (its trunk), and leaves, flowers and fruit. Like most plants, trees make their own food, with the roots absorbing water and minerals from the soil and transferring them to the leaves. The water and minerals are combined with carbon dioxide from the air and are formed into sugar.

A tree has three parts-roots, the trunk and the crown (all the branches and leaves). The roots spread out underground, anchoring the tree firmly in the soil. They take up more space below ground than the branches do above.

The trunk supports the crown of the tree and transports Water and minerals from the roots up the leaves.

Often, it takes several years to develop a root system which is mature enough to support a crown of a particular size. In fact, it has been found that development of a proper root system is the most time consuming part of developing a tree which will be harvested. For example, developing Spruce trees for use as Christmas Trees may take as many as fifteen Years, most of which is spent developing the proper root systems. Once the trees are harvested, stumps remain, and the root systems associated with such stumps may be wasted, along with the time spent developing such root systems. This wastes not only time, but does not maximize land use.

Therefore, there is a need for a means and a method for increasing the yield of trees being grown for harvesting by maximizing the use of root systems developed for such trees, and by maximizing the use of land used to develop such trees.

OBJECTS OF THE INVENTION

It is a main object of the present invention is to provide a means and a method for increasing the Yield of trees being grown for harvesting.

It is another object of the present invention to provide a means and a method for increasing the Yield of trees being grown for harvesting by maximizing the use of root systems developed for such trees.

It is another object of the present invention to provide a means and a method for increasing the Yield of trees being grown for harvesting by maximizing the use of root systems developed for such trees, and by maximizing the use of land used to develop such trees.

SUMMARY OF THE INVENTION

These, and other, objects are achieved bY a means and a method which cuts a tree trunk above a lowermost whorl of tree limbs, then supports each of these tree limbs in position to grow new sprouts. The new sprouts are then harvested for further use or for re-planting.

In this manner, once a root system is developed, it need not be sacrificed after harvesting the tree, but is re-used to generate further trees for harvesting. By re-using existant root systems, time and land are both efficiently used since new root systems need not be generated for each harvest.

BRIEF DESCRIPTION OF THE DRAWING FIGURES

FIG. 1 is a perspective view of a spruce tree which is suitable for harvesting and for use as a Christmas Tree.

FIG. 3 is an elevational view of an assembly that is used to increase the production of trees embodying the present invention.

FIG. 4 is a side elevational view of a tree limb-supporting unit of the assembly of the present invention.

FIG. 5 is a top plan view of the tree limb-supporting unit.

FIG. 6 is a top plan view of a cap unit of the assembly of the present invention.

FIG. 7 is an elevational view of one form of the cap unit of the present invention.

DETAILED DESCRIPTION OF THE PREFERRED EMBODIMENT OF THE INVENTION

Figure 2:
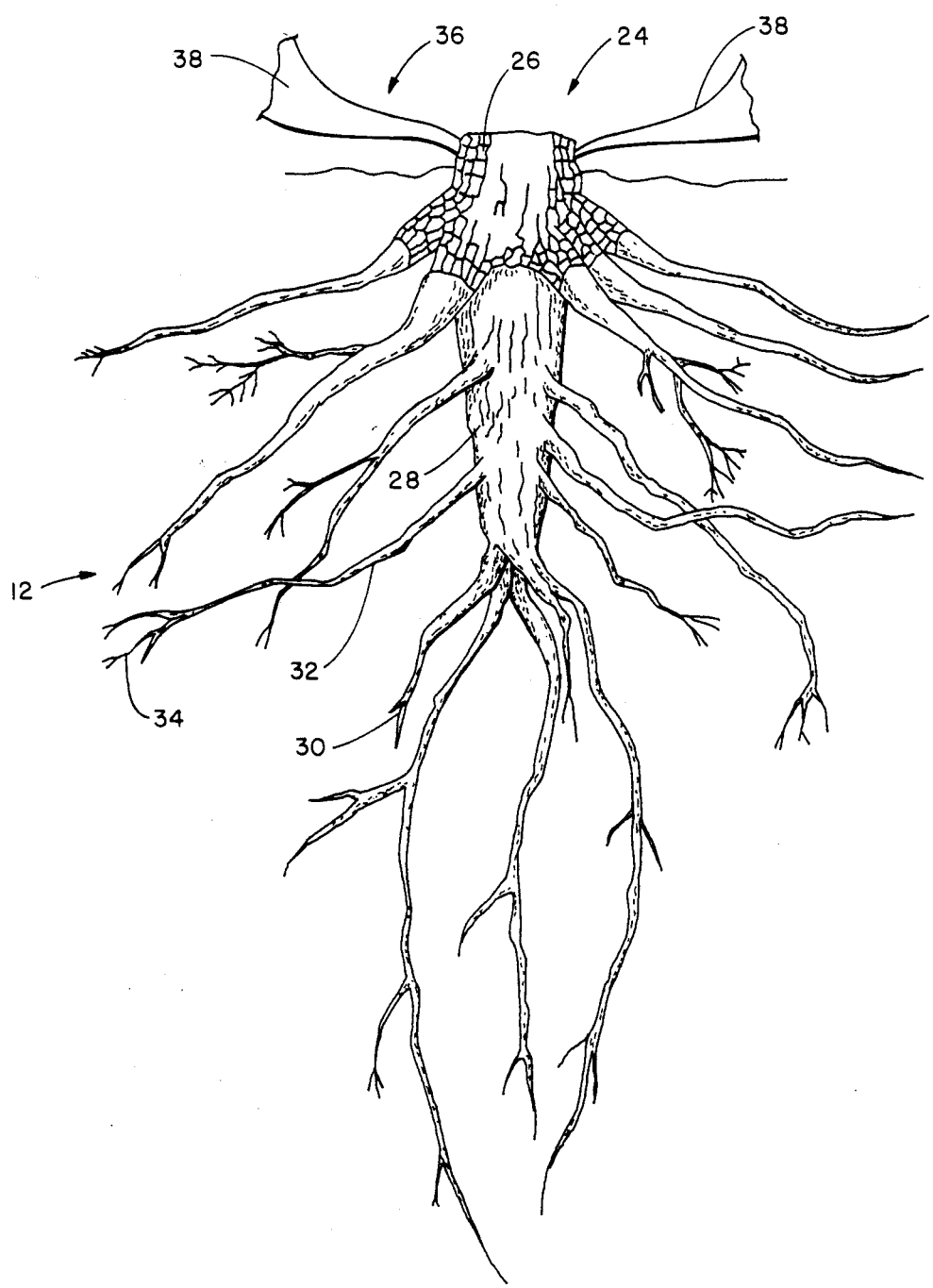
FIG. 2 is an elevational view of a stump having a well-developed root system and a whorl of tree limbs that have been left after the remainder of the tree has been harvested.

Shown in FIG. 1 is a Spruce tree 10 that is suitable for harvesting as a Christmas Tree. The tree 10 includes a root system 12 located beneath soil 14 and which supports a trunk 16 and a crown 18. The crown 18 contains tree limbs 20 that are attached to the trunk whorls. For the purposes of this disclosure, a whorl is defined as an arrangement of several identical anatomical parts, here tree limbs, in a circle around the same portion of a tree trunk.

Once the tree 10 is harvested, a stump remains. As shown in FIG. 2, a stump 24 includes a short portion 26 of the trunk 16 and the full root system 12, including the large tap root 28, primary roots 30, secondary roots 32, and tertiary roots 34. As discussed above, this root sYstem may take several years to develop, and should be utilized to its maximum if efficient production is to be achieved.

Accordingly, the means and method embodying the present invention makes maximum use of a root system after it has been developed by re-using such root system even after the main portion of the tree has been harvested. This means and method involve cutting the tree trunk above the lowermost whorl of tree limbs, indicated in FIG. 2 at 36, to leave the tree limbs 38 in such lowermost whorl attached to the stump. These remaining tree limbs are used to generate further sprouts that can be used to generate further trees, by re-planting or the like.

Figure 8:
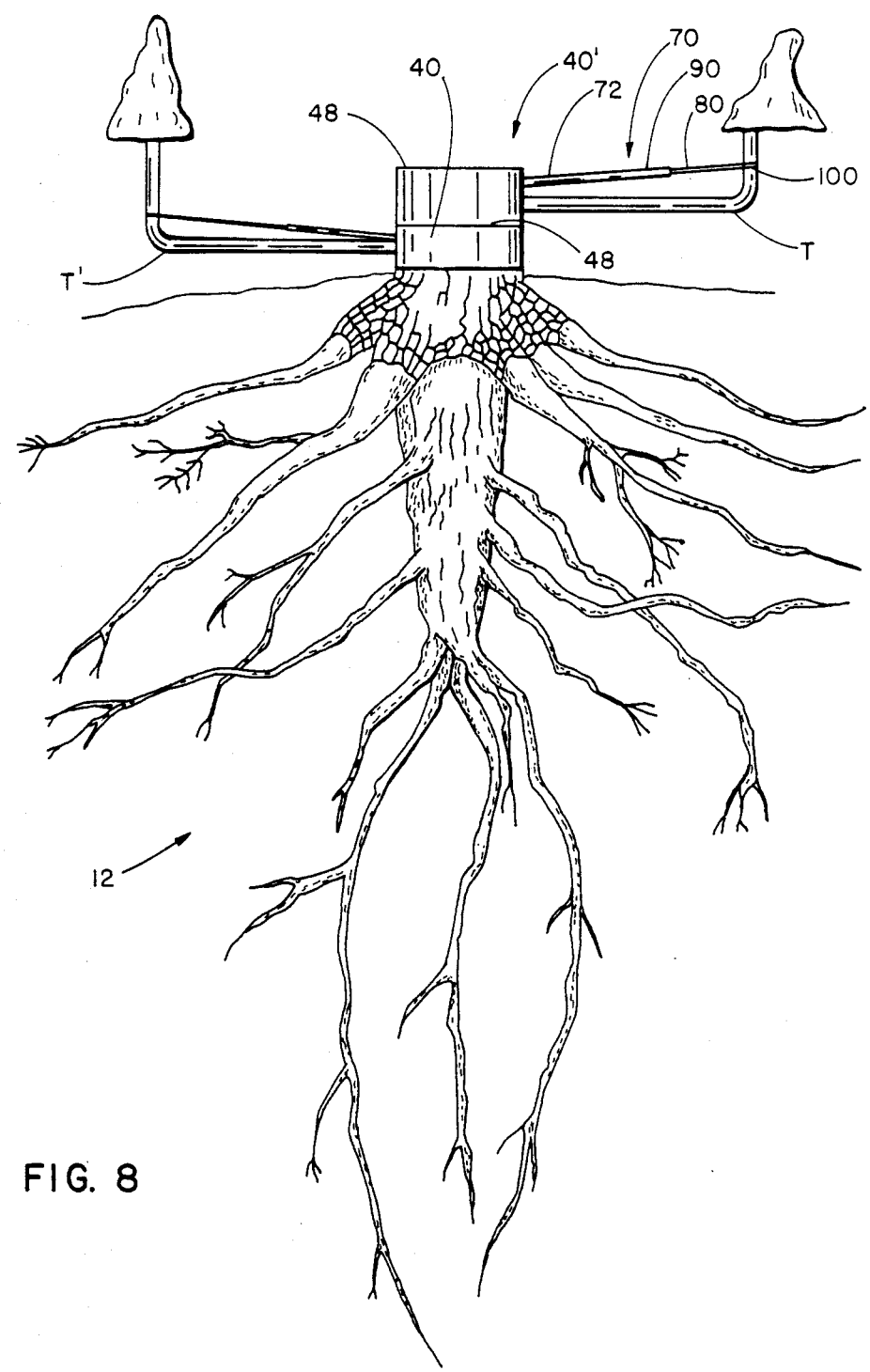
FIG. 8 is a side elevational view of a root system similar to the view of FIG. 2, but with the assembly of the present invention installed thereon.

As best shown in FIGS. 3 and 8, the means embodying the present invention includes a cap unit 40 that is mounted on top of the stump adjacent to the tree limbs in the remaining whorl. The cap unit 40 includes one or more tubular caps 42, each of which is slidably mounted on top of the stump adjacent to the limbs of that remaining whorl.

The caps are mounted on the stump according to the configuration of the remaining limbs. Thus, in some instances, such as when the remaining limbs are essentially co-planar with each other, caps 42, 42' and the like, will overlap each other as shown in FIG. 7, in some instances such as when the remaining limbs are at different levels, the caps will abut each other as shown in FIG. 3, or the like. Combinations of such cap configurations can also be used as necessary.

Referring to FIG. 3, it can be seen that each cap is tubular and includes an inferior end 46 connected to a superior end 48 by a cylindrical wall 50. The wall 50 has a first slot 52 defined therein which extends from the inferior end towards the superior end and which is sized so that a tree limb will slide therethrough as the cap is placed on the stump. A second slot 54 is defined in the wall to intersect the first slot and to extend roughly parallel to the ends of the cap.

A first tree limb-accommodating hole 56 is defined through the cylindrical wall 50 and the second slot 54 intersects such hole 56 to form a continuous passage from the cap inferior end 46 to the tree limb-accommodating hole 56 whereby the cap is placed on top of a tree stump, and one of the limbs of a remaining whorl is guided into the hole 56 via the slots 52 and 54.

In the instance that several tree limbs are co-planar, the cap used will include a special slot and hole unit 58 to accommodate a second limb. Such special slot and hole unit includes a third slot 60 defined in the wall to extend from the inferior end 46 towards the superior end 48, and an oblate elliptical tree limb-accommodating hole 62 defined through the wall to be intersected by the slot 60. The hole 62 is sized so that the cap can be maneuvered about and moved so other holes on the same cap can be moved into the most advantageous position to accommodate other tree limbs of the same whorl. One or more units 58 can be defined in a cap whereby several tree limbs can be accommodated by the same cap.

Each cap also includes at least one tree limb-supporting arm 70 thereon adjacent to one of the tree-limb accommodating holes 56. The tree limb-supporting arm 70 is fixedly attached to the wall 50 of the cap and extends outwardly therefrom at an angle to the superior and inferior ends as indicated in FIG. 3. Each cap can also include several such arms if suitable.

The arm is best shown in FIGS. 3, 4 and 5 to include a first arm portion 72 fixedly attached at a proximal end thereof to the cap wall 50, and having a distal end 76 spaced from the cylindrical wall 50. A blind-ended bore 78 is defined in the first arm to extend along the longitudinal axis of that first arm from the distal end 76 towards the proximal end 74.

A second arm portion 80 is slidably mounted on the first arm portion by being slidably received in the blind-ended bore 78 to move towards and away from the cap wall 50 as indicated by the double-headed arrow 82 in FIG. 4. The second arm portion 80 includes a first end 84 that is received in the blind-ended bore, and a second end 86 that is spaced from the first end and is connected thereto by a cylindrical surface of the second arm portion.

The second arm portion is slidably attached to the first arm portion by a fastener element 90 having a head 92 mounted on a threaded body 94 that is threadably received through a threaded bore 96 defined through the first arm portion to intersect the blind-ended bore 78. Rotation of the fastener element 90 will move the body thereof against the second arm portion to affix that second arm portion to the first arm portion, and retrograde movement of the fastener element will release that fastener element from engagement with the second arm portion to release the second arm portion from the first arm portion.

The tree limb-supporting arm 70 further includes a limb-engaging Y-shaped Yoke 100 on the second end thereof. The yoke 100 engages a tree limb from beneath that limb to support such limb at a position that is spaced from the stump.

As best shown in FIG. 6, the cap 42 includes a sap hole 102 in the superior end thereof whereby sap from the stump will be permitted to escape so the cap will not be moved by such sap.

The caps further includes locking elements, such as catches 104 pivotally mounted on the wall superadjacent to the inferior end, and a projection 106 on the wall subadjacent to the cap superior end. When several caps are placed in abutting contact as shown in FIG. 3, the caps locked together using the locking elements.

The method embodying the present invention is best understood with reference to FIG. 8 in which the lowermost whorl 36 of a harvested tree has two non-coplanar tree limbs T and T' attached to the stump. Each limb includes a sprout S on an end thereof. These sprouts will be used to generate further trees by maintaining the limbs attached to the stump to be fed by the extant root system 12.

A first cap 42 is mounted on the stump and has a limb-supporting arm 70 that will engage the tree limb T' to support such tree limb in position to orient the sprout associated with such tree limb in position to continue growing. The preferred orientation is to have the limb-supporting arm engage the limb from beneath, but since this is not always practical, the alternative orientation is shown in FIG. 8 for the sake of completeness. A second cap 40' is placed on top of the first cap in the telescoping fashion indicated in FIG. 7 so that the first cap fits into the second cap to have the arm 70 thereof support the tree limb T in position so that the sprout associated therewith can continue growing. It is noted that the unit 58 of the first cap can be employed to accommodate the tree limb T for engagement with the arm of the second cap 40'. Other suitable slots and holes can be defined in the caps, and the caps can be arranged in combinations such as shown in FIGS. 3 and 7 or a combination thereof, as will occur to those skilled in the art whereby all of the tree limbs of a whorl can be supported in position to continue the development of the sprouts on the limbs of the lowermost whorl.

Once one or more of these sprouts are developed to a desired maturity, such sprouts can be removed and re-planted or used as desired. Should any sprout develop several whorls, the above-described process can be repeated for the sprouts.

It is understood that while certain forms of the present invention have been illustrated and described herein, it is not to be limited to the specific forms or arrangements of parts described and shown.

I claim:
1. An assembly for increasing production of trees comprising:
(A) a first tubular cap which is slidably mounted on top of a tree stump superadjacent to a lowermost whorl of tree limbs of a tree, said cap including
  (1) an inferior end,
  (2) a superior end,
  (3) a cylindrical wall connecting said inferior and superior ends,
  (4) a first slot defined in said wall and extending from an inferior end towards said superior end,

(5) a second slot defined in said wall to intersect said first slot and to extend essentially parallel with said superior end, (6) a first tree limb-accommodating hole defined through said cap wall, with said second slot intersecting said limb-accommodating hole;

(B) a tree limb-supporting arm mounted on said cap wall adjacent to said limb-accommodating hole and including (1) a first arm portion having a proximal end fixedly attached to said cap wall and a distal end spaced from said proximal end, (2) a blind-ended bore defined in said first arm portion to extend from said distal end towards said proximal end, (3) a second arm portion having a first end slidably received in said blind-ended bore and extending outwardly of said blind-ended bore, (4) a limb-engaging Y-shaped Yoke on said second arm portion second end for supportingly engaging a tree limb at a location spaced from the stump, and (5) a fastener element attaching said second arm portion to said first arm portion.

2. The assembly defined in claim 1 wherein said tubular cap includes a sap hole defined through said superior end.

3. The assembly defined in claim 2 further including a second tubular cap which is slidingly mounted on the tree stump adjacent to said first tubular cap.

4. The assembly defined in claim 3 wherein said second tubular cap slidingly accommodates said first tubular cap.

5. The assembly defined in claim 4 wherein said second tubular cap includes a sap hole defined therethrough.

6. The assembly defined in claim 5 further including a third slot defined in said first tubular cap wall to extend from said first cap inferior end towards said first cap superior end at a location spaced from said first slot, and a second tree limb-accommodating hole defined in said first cap wall to be intersected by said third slot, said second limb-accommodating hole being larger than said first limb-accommodating hole.

7. The assembly defined in claim 6 further including a lock element releasably locking said first cap to said second cap.

8. The assembly defined in claim 7 wherein said lock element includes a catch pivotally mounted on said first cap adjacent to said inferior end and a projection on said second cap adjacent to a superior end of said second cap.

* * * * *